US008084967B2

(12) United States Patent
Tanaka

(10) Patent No.: US 8,084,967 B2
(45) Date of Patent: Dec. 27, 2011

(54) MOTOR CONTROLLER AND PRINTER

(75) Inventor: Atsushi Tanaka, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 491 days.

(21) Appl. No.: 12/275,490

(22) Filed: Nov. 21, 2008

(65) Prior Publication Data

US 2009/0136243 A1 May 28, 2009

(30) Foreign Application Priority Data

Nov. 22, 2007 (JP) ................................ 2007-303033

(51) Int. Cl.
*H02P 5/00* (2006.01)

(52) U.S. Cl. ..................... 318/34; 318/599; 318/400.22; 318/400.13; 318/434; 318/66; 323/274; 323/284; 363/74; 363/71; 361/23; 361/24; 361/25; 361/27; 361/28

(58) Field of Classification Search .................. 318/380, 318/599, 400.22, 400.13, 34, 434, 445, 432, 318/66, 67, 68; 361/23, 24, 25, 1, 27, 28, 361/7; 323/274, 284; 363/74, 71; 358/1.15, 358/1.14; 710/19

See application file for complete search history.

(56) References Cited

U.S. PATENT DOCUMENTS

| | | | | |
|---|---|---|---|---|
| 4,644,232 | A * | 2/1987 | Nojiri et al. | 318/66 |
| 5,105,208 | A * | 4/1992 | Matsuoka et al. | 347/129 |
| 5,847,948 | A * | 12/1998 | Gatto et al. | 363/65 |
| 6,809,489 | B1 * | 10/2004 | Yoshida et al. | 318/560 |
| 7,290,847 | B2 * | 11/2007 | Shirotori et al. | 347/17 |
| 7,417,400 | B2 * | 8/2008 | Takeishi et al. | 318/599 |
| 7,429,836 | B2 * | 9/2008 | Hongo | 318/66 |
| 7,615,958 | B2 * | 11/2009 | Takeishi et al. | 318/599 |
| 2004/0252337 | A1 | 12/2004 | Takabayashi et al. | |

FOREIGN PATENT DOCUMENTS

| | | |
|---|---|---|
| JP | 2002-347296 | 12/2002 |
| JP | 2004-310212 | 11/2004 |
| JP | 2006-271055 | 10/2006 |
| JP | 2006-296165 | 10/2006 |
| JP | 2007-037292 | 2/2007 |

* cited by examiner

*Primary Examiner* — Rita Leykin
(74) *Attorney, Agent, or Firm* — Banner & Witcoff, Ltd

(57) ABSTRACT

A motor controller is provided. The motor controller includes a motor drive unit that drives a plurality of motors; a thermal shutdown unit that is provided in the motor drive unit and that stops the plurality of motors in the case of an overload; a lock signal generation unit that generates a lock signal corresponding to a respective one of the plurality of motors when a rotational speed of the respective motor reaches a threshold speed set for the respective motor; and an operation determination unit which, when the lock signal generation unit interrupts lock signals for all of the plurality of motors, determines that thermal shutdown unit has operated.

5 Claims, 5 Drawing Sheets

MOTOR CONTROLLER AND PRINTER

CROSS REFERENCE TO RELATED APPLICATION

The present application claims priority from Japanese Patent Application No. 2007-303033, which was filed on Nov. 22, 2007, the disclosure of which is herein incorporated by reference in its entirety.

1. Technical Field

Apparatus and devices consistent with the present invention relate to a motor controller and a printer that have a motor drive unit for driving motors and, more particularly, to a motor controller and a printer that have a thermal shutdown unit for halting the motors in an overloaded state.

2. Background

Japanese Unexamined Patent Application Publication No. JP-A-2006-271055 describes a related art motor controller. The related art motor controller equipped with a motor drive unit, such as a motor driver integrated circuit (IC), has hitherto been proposed to have a thermal shutdown unit that halts motors in the case of an overload. The thermal shut down unit typically includes a positive temperature coefficient (PTC) thermister that limits energization of the motors in the case of an overload. After being halted by the operation of the thermal shutdown unit, motors can recover to a normal condition after cooling occurs. However, an error accompanied by a halt of the motors is often handled as a so-called service error from which the motor controller cannot be easily restored without external assistance, for example, from a serviceman having a special technique, equipment, or the like. For this reason, it has been proposed to place an additional thermister in the vicinity of the PTC thermister in order to determine that the PTC thermister has operated. If a temperature of the additional thermister is equal to or higher than a predetermined value, it is determined that the PTC thermister has operated, the motors are stopped, and driving of the motors is resumed after a lapse of five minutes on a timer is waited. In other words, the additional thermister is able to stop the motors before the PTC thermister causes a hard thermal shutdown which requires a serviceman to correct. Since the motors are stopped before this hard thermal shutdown, driving of the motors may be resumed after waiting for a period of time, for example a period of about five minutes.

SUMMARY

According to the technique described in JP-A-2006-271055, the additional thermister, which is used for measuring a temperature of the PTC thermister, must be provided in order to determine operation of the PTC thermister, which in turn leads to an increase in the number of pins of an electronic circuit as well as to an increase in the number of signal lines that must be handled. However, some general motor driver ICs which incorporate thermal shutdown circuits include only an input pin and an output pin. The input pin is used for inputting a motor speed control signal from the outside and the output pin is used for outputting a lock signal to the outside when the motors have reached the predetermined speed. Accordingly, the technique described in JP-A-2006-271055 cannot be applied, in its unmodified form, to such general motor driver ICs. Thus, a motor drive unit, or the like, must be implemented separately from the general motor driver IC to use the foregoing technique, which in turn increases manufacturing cost of the motor controller. Further, a timer must additionally be provided in order to determine the lapse of the period of time after which the motors may again drive. This also results in an increase in the manufacturing cost of the motor controller.

Illustrative aspects of the present invention address the above disadvantages and other disadvantages not described above. However, the present invention is not required to overcome the disadvantages described above, and thus, an illustrative aspect of the present invention may not overcome any of the problems described above.

Accordingly, the present invention has been conceived with a view toward preventing occurrence of a service error, in a motor controller having a motor drive unit that drives a plurality of motors, during operation of a thermal shutdown unit by preventing an increase in the number of signal lines and by using a common motor drive unit. Further, the present invention has been conceived with a view toward implementing re-driving of a motor without the addition of a new configuration after the motor has been stopped by operation of a thermal shutdown unit.

According to an illustrative aspect of the present invention, there is provided a motor controller comprising a motor drive unit that drives a plurality of motors; a thermal shutdown unit that is provided in the motor drive unit and that stops the plurality of motors in the case of an overload; a lock signal generation unit that generates a lock signal corresponding to a respective one of the plurality of motors when a rotational speed of the respective motor reaches a threshold speed set for the respective motor; and an operation determination unit which, when the lock signal generation unit interrupts lock signals for all of the plurality of motors, determines that thermal shutdown unit has operated.

According to another illustrative aspect of the present invention, there is provided a printer comprising a motor drive unit that drives a motor; a print unit that performs printing using the motor; a thermal shutdown unit that is provided in the motor drive unit and that stops the motor in the case of an overload; an operation determination unit which determines that the thermal shutdown unit has operated; and an error processing shift unit that shifts, when the operation determination unit determines that the thermal shutdown unit has operated, processing of a control system including the motor drive unit to error processing which can be handled by a general user.

According to yet another illustrative aspect of the present invention, there is provided a printer comprising a plurality of motors that are used for printing; a motor drive integrated circuit which drives the plurality of motors and which comprises a thermal shutdown circuit that stops the plurality of motors in the case of an overload; an application specific integrated circuit which receives a signal indicating a rotational speed for each of the plurality of motors from the motor drive integrated circuit, and which comprises a lock signal generation circuit that generates a lock signal corresponding to a respective one of the plurality of motors if a rotational speed of the respective motor reaches a threshold speed for the respective motor; an operation determination unit which, when the lock signal generation unit interrupts lock signals for all of the plurality of motors, determines that thermal shutdown unit has operated; and an error processing shift unit that, when the operation determination unit determines that the thermal shutdown unit has operated, shifts to jam processing.

According to yet another illustrative aspect of the present invention, there is a motor controller comprising: a motor drive unit that drives a plurality of motors, the motor drive unit comprising a stop unit that stops rotations of the all motors when a temperature of the motor drive unit is higher than a predetermined temperature; a rotational speed determining unit that is configured to determine whether a rotational speed of each of the motors reaches a predetermined speed that is set for a respective one of the motors; a determining unit that is configured to determine whether the stop unit is activated based on a result of the determination of the rotational speed determining unit; and an operation executing unit that executes a predetermined operation based on a result of the determination of the determining unit; wherein the determining unite when the rotational speed determining unit determines that the each of the motors does not rotate at the predetermined speed, determines that the stop unit is activated, the determining unit, when the rotational speed determining unit determines that at least one of the motors rotates at the predetermined speed, determines that the stop unit is not activated, and wherein the operation executing unit, when the determining unit determines that the stop unit is activated, executes the predetermined operation.

According to yet another illustrative aspect of the present invention, there is a printer comprising: a printing mechanism that comprises a plurality of motors; a motor drive unit that drives the plurality of motors; a plurality of determining units, each of the determining units is provided so as to be associated with a respective one of the motors and determines that the respective motor rotates at a predetermined number of rotations; and a control unit that is configured to control the printing mechanism based on results of the plurality of the determining units, wherein the control unit, when each of the results of the determinations of the determining units is that the respective motor does not rotate at the predetermined number of rotations, executes a predetermined error operation, and the control unit, when there are a result that one of the motors does not rotate at the predetermined speed and a result that the other one of the motors rotates at the predetermined number of rotations in the determinations of the determining units, determine that the printer has broken down and stops an operation of the printing mechanism.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Exemplary embodiments of the present invention will be described by reference to the drawings. As will be described below, the exemplary embodiments correspond to the application of the present invention to a so-called laser printer taken as an example printer.

1. Overall Configuration of the Printer

Figure 1:
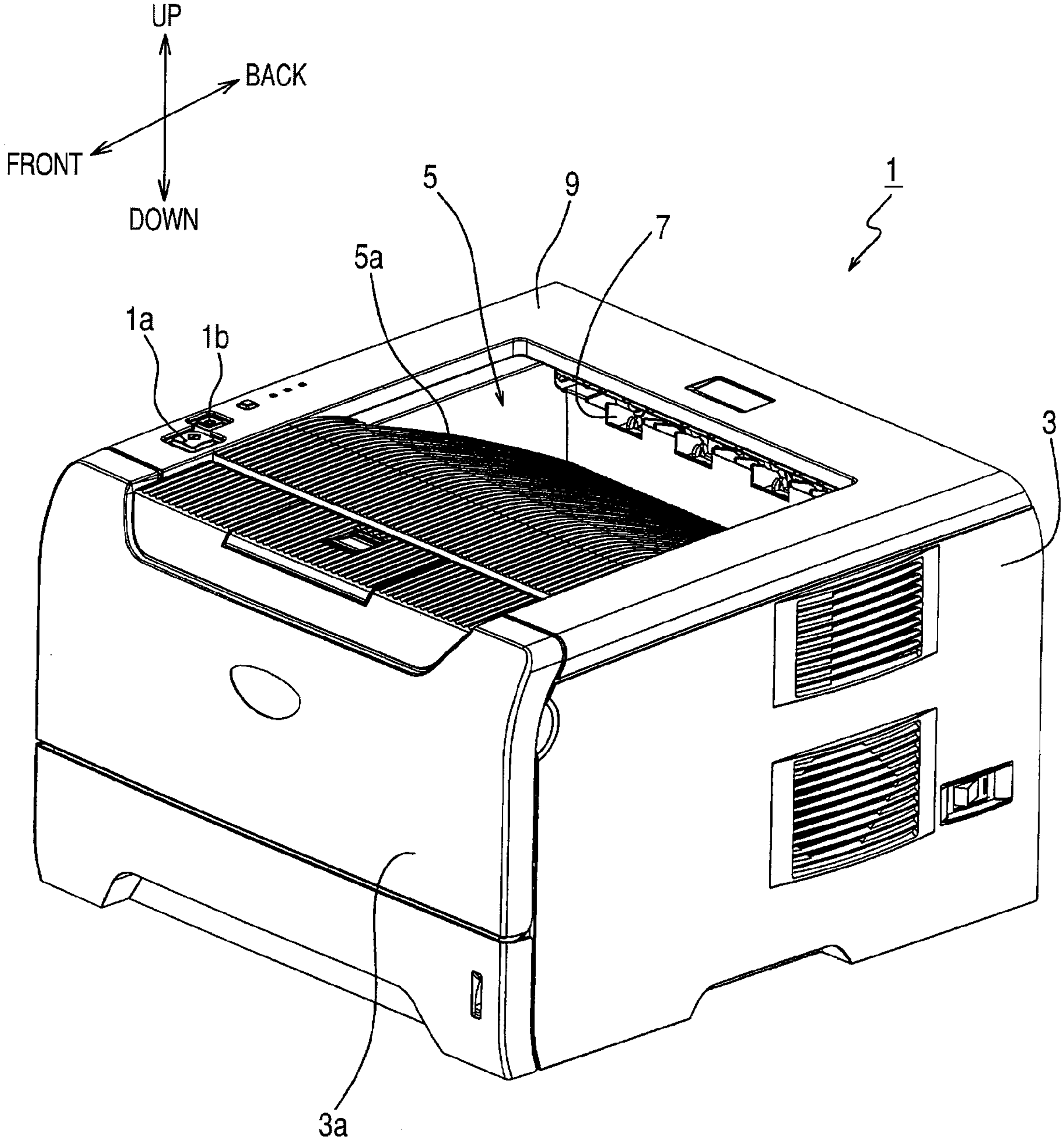
FIG. 1 is a perspective view of a printer according to an exemplary embodiment of the present invention.

FIG. 1 is a perspective view showing the appearance of a printer 1 of according to an exemplary embodiment of the present invention. The printer 1 may be a laser printer or the like. The printer 1 is installed while the upside of a sheet is taken as an upside in the direction of gravity. The printer is usually used while its left front side in the drawing is taken as the front.

A housing 3 of the printer 1 is formed into an essentially-box-shaped form (i.e., the form of a rectangular parallelepiped). A sheet discharge tray 5, onto which a recording medium ejected from the housing 3 after having undergone printing is to be loaded, is provided on an upper surface of the housing 3. A front cover 3*a* is provided on the front of the housing 3, and a process cartridge 80 to be described later can be removed by opening the front cover. In the present exemplary embodiment, a sheet, such as paper or an overhead projector (OHP) sheet, is used as a recording medium.

The sheet discharge tray 5 is built with a slope 5*a* that is inclined so as to become lower from the upper surface of the housing 3 with an increasing distance in a backward direction. An ejection section 7 where a recording medium on which printing has finished is to be ejected is provided at a rearward end of the slope 5*a*.

On the housing 3, an upper cover 9 formed into an essentially-C-shaped form so as enclose the sheet discharge tray 5 (the slope 5*a*) is equipped with a line switch 1*a* for toggling between a configuration in which the printer 1 is connected to a network and a configuration in which the printer 1 is disconnected from the network, a job cancel switch 1*b* for forcefully terminating (interrupting) printing operation, and the like.

2. Internal Configuration of the Printer

Figure 2:
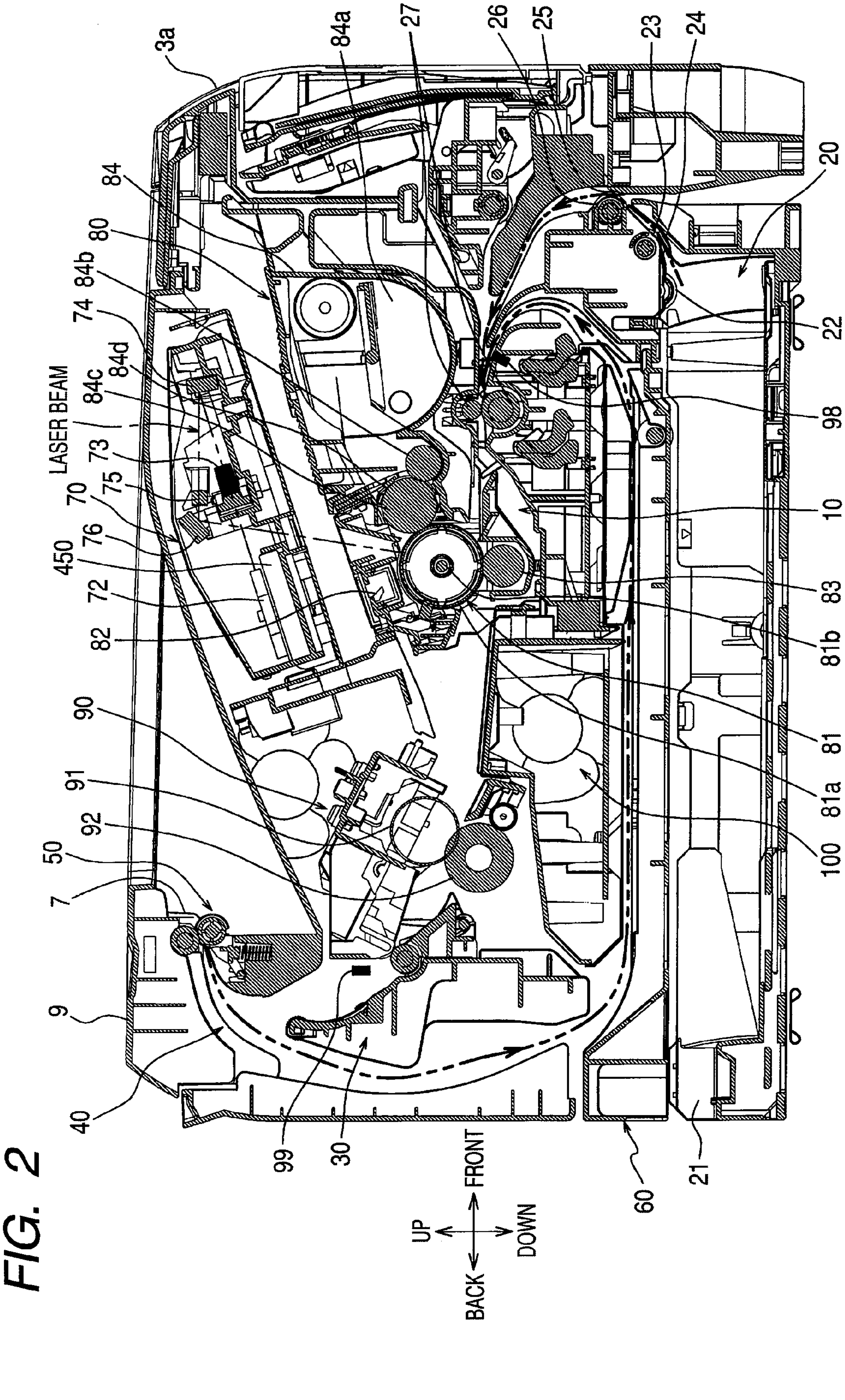
FIG. 2 is a longitudinal cross-sectional view showing an internal configuration of the printer of FIG. 1.

FIG. 2 is a longitudinal view showing the internal configuration of the printer 1. An image formation section 10 housed in the printer 1 constitutes a print unit that subjects a recording medium to printing, and a feeder section 20 constitutes a part of a conveyance unit that feeds the recording medium to the image formation section 10.

A first discharge chute 30 and a second discharge chute 40 constitute a guide member that turns an angle of about 180° the recording medium having finished undergoing printing in the image formation section 10 so as to make a U-turn of the direction of conveyance of a recording medium, thereby guiding the recording medium to the ejection section 7 disposed above a fixing unit 90.

A forward/backward switching mechanism 50 constitutes a discharge roller inversion mechanism that inverts the direction of conveyance of a recording medium discharged from the image formation section 10 and that again conveys to the image formation section 10 the recording medium whose direction of conveyance was inverted. A double-sided print unit 60 constitutes a conveyance path for the recording medium whose direction of conveyance is inverted by the forward/backward switching mechanism 50.

2.1. Feeder Section

The feeder section 20 is made up of a sheet feeding tray 21 housed in the lowermost portion of the housing 3; a sheet feeding roller 22 that is disposed at an upper front end of the sheet feeding tray 21 and that conveys the recording medium to the image forming section 10; a separation roller 23 and a separation pad 24 that separate, one at a time, the recording medium conveyed by the sheet feeding roller 22; and the like. The recording medium loaded on the sheet feeding tray 21 is conveyed to the image forming section 10 disposed essentially at the center within the housing 3 so as to make a U-turn at the front side within the housing 3.

A paper dust removal roller 25 for removing paper dust, and the like, adhering to an image formation surface (i.e., a print surface) of the recording medium is disposed at the outside of a crest of the essentially-U-shaped turn of a recording medium conveyance path extending from the sheet feeding tray 21 to the image formation section 10. An opposing roller 26 for pressing the conveyed recording medium against the paper dust removal roller 25 is disposed at the inside of the crest.

A registration roller 27 that consists of a pair of rollers and that imparts conveyance resistance to the recording medium, to thus make a correction to the state of conveyance of the recording medium is provided at the entrance of the image formation section 10 in the conveyance path extending from the sheet feeding tray 21 to the image formation section 10.

2.2. Image Formation Section

The image formation section 10 is made up of a scanner section 70, the process cartridge 80, the fixing unit 90, and the like.

2.2.1. Scanner Section

The scanner section 70 is disposed at an upper position within the housing 3; generates an electrostatic latent image on the surface of the photosensitive drum 81 to be described later; and is made up of an unillustrated laser light source, a polygon mirror 72 to be driven by a polygon motor 450, an fθ lens 73, a reflection mirror 74, a lens 75, and a reflection mirror 76.

The laser beam that is emitted from the laser light source and based on image data undergoes deflection on the polygon mirror 72 and passes through the fθ lens 73, and subsequently an optical path of the laser beam is returned by the reflection mirror 74. Further, after the laser beam passes through the lens 75, the optical path of the laser beam is downwardly bent by the reflection mirror 76, where upon the laser beam is radiated on the surface of the photosensitive drum 81, to thus generate an electrostatic latent image.

2.2.2. Process Cartridge

The process cartridge 80 is removably disposed in the housing 3 at a position below the scanner section 70. The process cartridge 80 is made up of a photosensitive drum 81, an electrifier 82, a transfer roller 83, a development cartridge 84, and the like.

The photosensitive drum 81 is made up of a cylindrical drum main body 81*a* whose outermost layer is formed from a positively-charged photosensitive layer, such as polycarbonate; and a drum shaft 81*b* that extends, at the shaft of the drum main body 81*a*, in the longitudinal direction of the drum main body 81*a* and that rotatably supports the drum main body 81*a*.

The electrifier 82 is for charging the surface of the photosensitive drum 81 prior to formation of an electrostatic latent image by means of the laser beam, and is disposed, at the obliquely upper rear of the photosensitive drum 81, opposite the photosensitive drum 81 at a predetermined spacing so as not to contact the photosensitive drum 81. The electrifier 82 of the present exemplary embodiment adopts a scorotoron electrifier that essentially, uniformly electrifies the surface of the photosensitive drum 81 with positive electric charges by utilization of a corona discharge.

The transfer roller 83 constitutes a transfer unit that is positioned opposite the photosensitive drum 81; that rotates in synchronism with rotation of the photosensitive drum 81; and that applies, to the recording medium from the other side of the print surface, electric charges (negative charges in the exemplary embodiment) opposite in polarity to the electric charges used for electrifying the photosensitive drum 81 when the recording medium passes by the neighborhood of the photosensitive drum 81, thereby transferring toner adhering to the surface of the photosensitive drum 81 to the print surface of the recording medium.

The development cartridge 84 is made up of a toner storage chamber 84*a* storing toner, a toner supply roller 84*b* for supplying toner to the photosensitive drum 81, a development roller 84*c*, and the like. The toner housed in the toner storage chamber 84*a* is supplied to the development roller 84*c* by means of rotation of the toner supply roller 84*b*. Further, the toner supplied to the development roller 84*c* is carried on the surface of the development roller 84*c* and then regulated by a layer thickness regulation blade 84*d* to a predetermined thickness and frictionally electrified. Subsequently, the toner is supplied to the surface of the photosensitive drum 81 exposed by the scanner section 70.

2.2.3. Fixing Unit

The fixing unit 90 is positioned downwardly of the photosensitive drum 81 with respect to the direction of conveyance of the recording medium and intended for thermally fusing the toner transferred on the recording medium, to thus fix the toner. Specifically, the fixing unit 90 is made up of a heating roller 91 that is disposed on the print surface side of the recording medium and heats toner; a pressure roller 92 that is disposed on the other side of the heating roller 91 with the recording medium sandwiched therebetween and that presses the recording medium toward the heating roller 91; and the like.

Incidentally, the heating roller 91 of the present exemplary embodiment is made up of a metal tube whose surface is coated with a fluorine resin and a halogen lamp incorporated in the metal tube for heating purpose. In the meantime, the pressure roller 92 is formed by coating a roller shaft constructed from metal with a roller made of a rubber material.

In the image formation section 10 described above, the recording medium is subjected to printing as follows. Specifically, after positively charged by the electrifier 82 in a uniform manner along with rotation of the photosensitive drum, the surface of the photosensitive drum 81 is exposed by means of a high-speed scan of the laser beam emitted from the scanner section 70. Thereby, an electrostatic latent image corresponding to an image to be printed on the recording medium is formed on the surface of the photosensitive drum 81.

Subsequently, when contacting the photosensitive drum 81 in an opposing manner, the positively-charged toner carried on the development roller 84*c* is supplied, by means of rotation of the development roller 84*c*, to the electrostatic latent image formed on the surface of the photosensitive drum 81; namely, an exposed area of the uniformly, positively charged surface of the photosensitive drum 81 whose electric potential has decreased as a result of exposure to the laser beam. Thereby, the electrostatic latent image of the photosensitive drum 81 is visualized, and a toner image generated through reversal development is carried on the surface of the photosensitive drum 81.

Subsequently, the toner image carried on the surface of the photosensitive drum 81 is transferred to the recording medium by means of a transfer bias applied to the transfer roller 83. The recording medium on which the toner image has been transferred is conveyed to the fixing unit 90, where the medium is heated, whereby the toner transferred as a toner image is fixed to the recording medium. Thus, printing is completed. Further, medium sensors 98 and 99 for detecting that the recording medium is conveyed along with printing operation are provided in the printer 1 upstream of the registration roller 27 and downstream of the fixing unit 90 with respect to the direction of conveyance of the recording medium.

When the medium sensor 98, 99, or the like, has detected a paper jam, the front cover 3*a* is opened, to thus remove the process cartridge 80. Thereby, clogging of the recording medium at any point in the course of conveyance can be eliminated.

3. Configuration of a Control System of the Printer

In addition to having the previously-described polygon motor 450, the printer 1 has a main motor 460 (see FIG. 3) that drives various rollers and the photosensitive drum 81. The configuration of a control system according to an exemplary embodiment of the present invention for the polygon motor 450 and the main motor 460 will now be described by use of a block diagram of FIG. 3.

Figure 3:
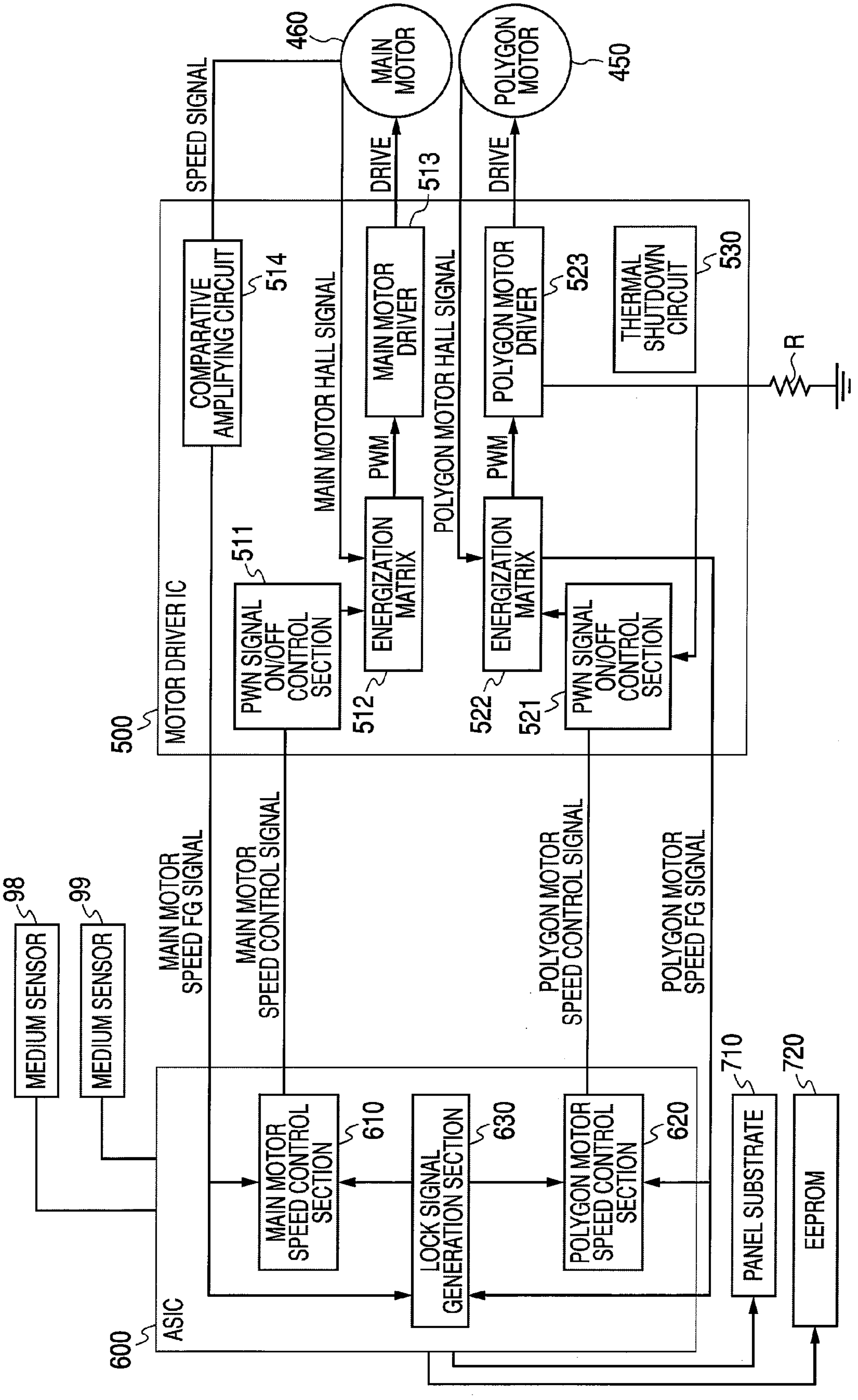
FIG. 3 is a circuit diagram showing a configuration of a control system, according to an exemplary embodiment of the present invention, of the printer of FIG. 1.

As shown in FIG. 3, the polygon motor 450 and the main motor 460, which serve as example motors, are connected to a motor driver IC 500 serving as an example motor drive unit. Further, the motor driver IC 500 is connected to an Application Specific Integrated Circuit (ASIC) 600 that has a central processing unit (CPU), and the like, and that controls the motor driver IC 500.

The ASIC 600 has a main motor speed control section 610 that generates a main motor speed control signal; a polygon motor speed control section 620 that generates a polygon motor speed control signal; and a lock signal generation section 630 serving as an example lock signal generation unit that generates a lock signal to be described later.

The motor driver IC 500 has a pulse width modulated (PWM) signal ON/OFF control section 511 to which the main motor speed control signal is input. The PWM signal ON/OFF control section 511 outputs a PWM signal corresponding to the main motor speed control signal to a main motor driver 513 by way of an energization matrix 512. The main motor driver 513 outputs a drive signal corresponding to the PWM signal to the main motor 460.

A main motor hall signal generated by a hall element provided on the main motor 460 is fed back to the energization matrix 512. A speed signal of the main motor 460 is fed to a comparative amplifying circuit 514, which compares the speed signal with a predetermined value and amplifies the speed signal. The output signal from the comparative amplifying circuit 514 is input to the main motor speed control section 610 and to the lock signal generation section 630 as a main motor speed frequency generator (FG) signal. The main motor speed FG signal conforms to a rotation period of the main motor 460. The lock signal generation section 630 detects a rotational speed of the main motor 460 based on the main motor speed FG signal and determines whether the rotational speed of the main motor 460 is within a predetermined target range (that is, the rotational speed is higher than the lower threshold of the target range and is lower than the upper threshold of the target range). When the rotational speed of the main motor 460 is within the predetermined target range, the lock signal generation section 630 generates a lock signal.

The motor driver IC 500 has an analogous configuration with regard to the polygon motor 450. Specifically, the motor driver IC 500 comprises a PWM signal ON/OFF control section 521 to which the polygon motor speed control signal is input. The PWM signal ON/OFF control section 521 outputs a PWM signal corresponding to the polygon motor speed control signal to a polygon motor 523 by way of an energization matrix 522. The polygon motor driver 523 outputs a drive signal corresponding to the PWM signal to the polygon motor 450.

The polygon motor hall signal generated by the hall element provided on the polygon motor 450 is fed back to the energization matrix 522. The energization matrix 522 outputs a polygon-motor speed FG signal based on a rotation period of the polygon motor 450 to the polygon motor speed control section 620 and the lock signal generation section 630. The lock signal generation section 630 detects a rotational signal of the polygon motor 450 based on the polygon motor speed FG signal and determines whether the rotational speed of the polygon motor 450 is within a predetermined target range (that is, the rotational speed is higher than the lower threshold of the target range and is lower than the upper threshold of the target range). When the rotational speed of the polygon motor 450 is within the predetermined target range, the lock signal generation section 630 generates a lock signal. Further, a drive current of the polygon motor 450 which is fed from the polygon motor driver 523 is detected using a polygon current detection resistor R, and the detected drive current is input to the PWM signal ON/OFF control section 521.

The motor driver IC 500 further has, as an example thermal shutdown unit, a thermal shutdown circuit 530 that stops the polygon motor 450 and the main motor 460 in the case of an overload. The ASIC 600 is additionally coupled to medium sensors 98 and 99, a panel substrate 710 that controls a display panel omitted from the drawings, and an electrically erasable and programmable read only memory (EEPROM) 720.

4. Control Effected by the Control System

Figure 4:
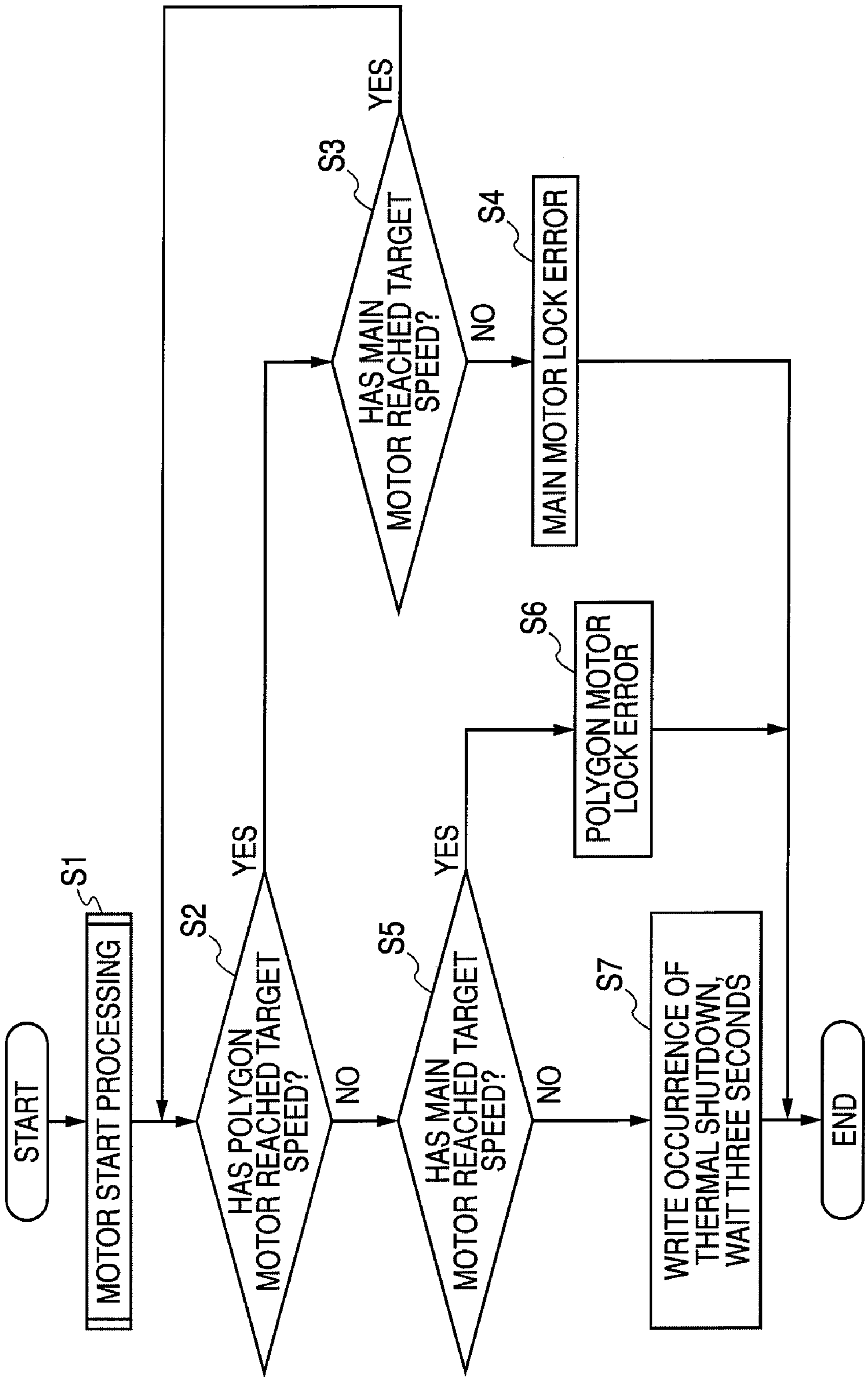
FIG. 4 is a flowchart showing motor drive processing, according to an exemplary embodiment of the present invention, performed by the control system of FIG. 3.

Subsequently, in the present exemplary embodiment configured as mentioned above, control operation performed by the ASIC 600 will now be described. FIG. 4 is a flowchart showing motor drive processing performed by the ASIC 600 when the printer 1 is provided with a print command. As shown in FIG. 4, in the processing procedures, motor start processing for driving the polygon motor 450 and the main motor 460 is first performed in operation S1 without making a reference to the respective lock signals.

When a round of motor start processing operations pertaining to operation S1 is completed, it is then determined in operation S2 whether the rotational speed of the polygon motor 450 has reached a target speed based on the determination whether the lock signal for the polygon motor 450 is generated or not. If the lock signal for the polygon motor 450 is generated, that is, if it is determined that the rotational speed of the polygon motor 450 reached the target speed (Y in operation S2), it is determined whether the rotational speed of the main motor 460 has reached a target speed based on the determination whether the lock signal for the main motor 460 is generated or not in operation S3. If the lock signal for the main motor 460 is generated, that is, if it is determined that the rotational speed of the main motor 460 reached the target speed (Y in operation S3), processing proceeds to operation S2. Processing pertaining to S2 through S4 is iterated, and a print operation performed by the image formation section 10 is performed in the meantime.

However, if it is determined that the main motor 460 has not reached the target speed (N in operation S3) in spite of the polygon motor 450 having reached the target speed (Y in operation S2), a main motor lock error is generated in operation S4, and processing is temporarily stopped. The main motor lock error is a kind of so-called service error that is recoverable by a serviceman, and the printer 1 can be restarted after being adjusted and reset by the serviceman.

If the lock signal for the polygon motor 450 is not generated and it is determined that the polygon motor 450 has not reached the target speed in operation S2 (N in operation S2), it is then determined whether the lock signal for the main motor 460 is generated, that is, whether the main motor 460 has reached the target speed in operation S5. Operation S5 is an example of an operation determination unit. If it is determined that the polygon motor 450 is determined not to have reached the target speed (N in operation S2) in spite of the main motor 460 having reached the target speed (Y in operation S5), a polygon motor lock error is generated in operation S6, and processing is temporarily terminated. The polygon motor lock error is also a kind of so-called service error that is recoverable by a serviceman. The error is reset after being adjusted by the serviceman, thereby enabling re-start of the printer 1.

On the other hand, if it is determined that the polygon motor 450 does not reach the target speed (N in operation S2) and the main motor 460 does not reach the target speed (N in operation S5), the polygon motor 450 and the main motor 460 can be estimated to be simultaneously stopped by operation of the thermal shutdown circuit 530. In this case (N in operation S5), processing proceeds to operation S7, the occurrence of thermal shutdown is written into the EEPROM 720, and processing is temporarily terminated after waiting three seconds. Operation S7 is an example of an error processing shift unit.

Figure 5:
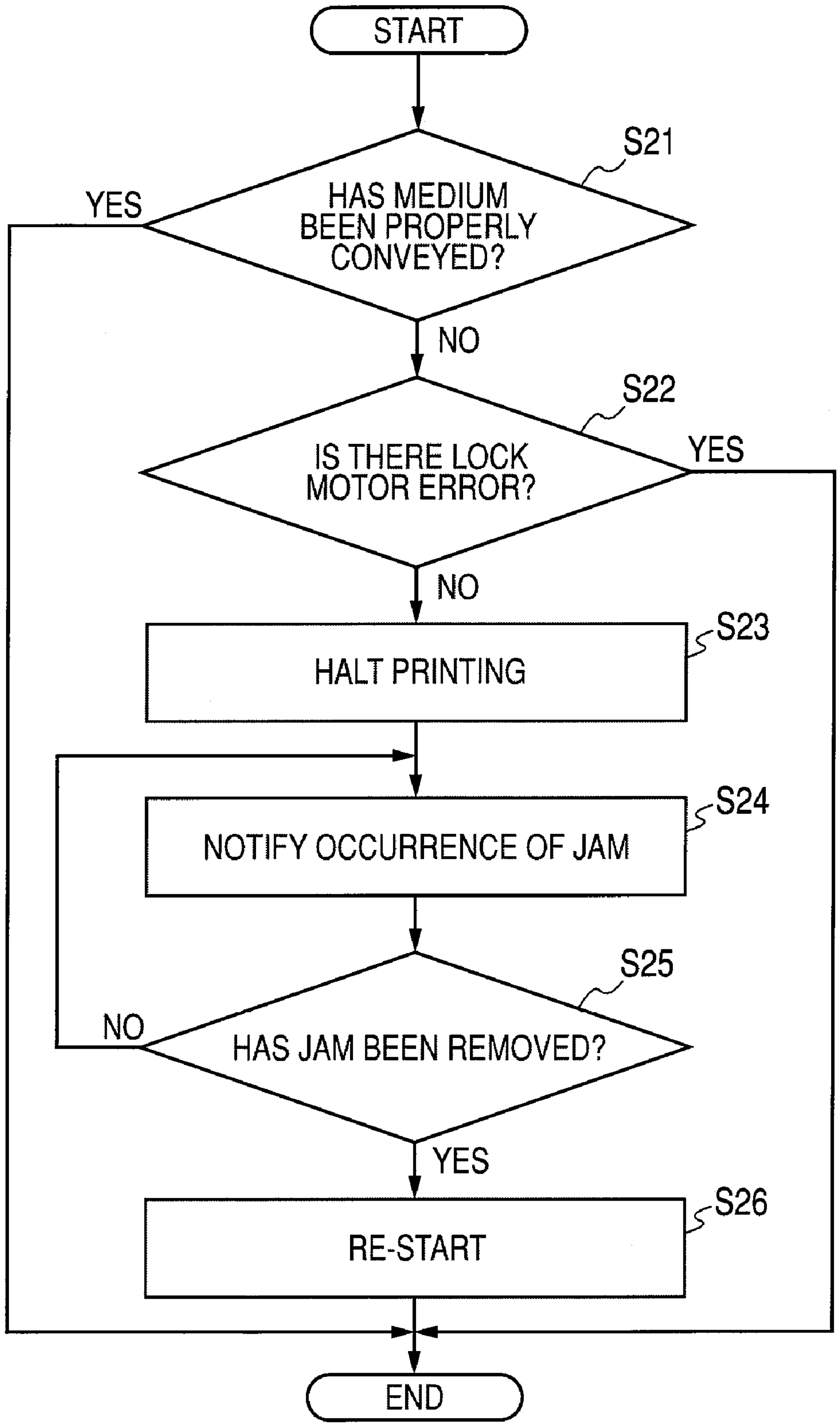
FIG. 5 is a flowchart showing a jam processing routine, according to an exemplary embodiment of the present invention, performed by the control system of FIG. 3.

During the wait of three seconds, jam processing that can be recovered by a general user is performed. The jam processing is an example of error processing that can be recovered by the general user. FIG. 5 is a flowchart showing a jam processing routine, according to an exemplary embodiment of the present invention, for executing jam processing. The jam processing routine is executed at a time interval by means of an interrupt during the printing operation (including the wait of three seconds). As shown in FIG. 5, it is first determined in operation S21 whether the recording medium has been properly conveyed. Operation S21 is an example of processing shift processing. Processing pertaining to operation S21 is processing for determining whether the medium sensors 98 and 99 have detected the recording medium within a period of time since the sheet feeding roller 22 was rotated (e.g., within three seconds). If the recording medium is properly conveyed (Y in operation S21), any operation for the jam processing routine are not executed, and then the jam processing routine is terminated.

On the other hand, if it is determined that the recording medium is not properly conveyed (N in operation S21), processing proceeds to operation S22, in which it is determined whether a motor lock error, such as the foregoing main motor lock error, the polygon motor lock error, and the like, has arisen. That is, it is determined whether the lock signal for the each of the motors is generated or not. If it is determined that there is a motor lock error (Y in operation S22), processing is terminated, and the service error is continued.

However, if it is determined that no motor lock error is present (that is, the lock signals for the all motors are generated, respectively) (N in operation S22), i.e., in the case in which the recording medium is not properly conveyed even though there is no motor lock error, processing proceeds to operation S23, in which the main motor 460, or the like, is stopped, to thus abort printing operation. Operation S23 is an example of normal jam processing. Next, in operation S24, a notification of the jam is made.

Accordingly, when the main motor 460 is stopped by operation of the thermal shutdown circuit 530, conveyance of the recording medium is stopped. Hence, jam processing pertaining to operation S23 is performed by means of an interrupt during the wait of three seconds in operation S7. The jam processing is error processing that can be recovered by the user. The processing then determined whether the jam has been removed in operation S25. If it is determined that the jam still exists (N in operation S25), processing returns to operation S24. On the other hand, after the user has performed operation for opening the front cover **3*a* to remove the recording medium being conveyed, the front cover 3*a* is closed, the jam is cleared. When it is determined that the jam has been removed (Y in operation S25), the printer 1 is re-started in operation S26. Specifically, the polygon motor 450**, and the like, is re-started, and preparations for re-printing are commenced.

Six seconds usually elapse from when processing pertaining to operation S7 is performed until notification pertaining to operation S24 is completed. Further, operation for removing a jam performed by the user is also added, and hence the time becomes longer. The thermal shutdown state is canceled within about five seconds after stoppage of the polygon motor 450 and the main motor 460. The thermal shutdown state is resolved in a period during which the user performs the recovery operation in response to the notification pertaining to operation S24. At the time of restart of the printer 1, the thermal shutdown circuit 530 does not operate.

5. Advantages of the Above-Described Exemplary Embodiment

As mentioned above, when the lock of the polygon motor 450 and the lock of the main motor 460 are simultaneously disengaged (N in operation S5), the thermal shutdown circuit 530 is determined to have operated (operation S7). Therefore, even when the common motor driver IC 500 is utilized, it can be readily determined that the thermal shutdown circuit 530 has operated. For instance, even when the motor driver IC having only a pin for inputting the speed control signal from the outside and a pin for outputting a lock signal when the motor has reached a predetermined speed is used in place of the motor driver IC 500, operation of the thermal shutdown circuit can be determined on the basis of simultaneous disengagement of the two locks.

When the thermal-shutdown circuit 530 is determined to have operated (operation S7), processing shifts to jam processing (operation S23). Hence, occurrence of a service error, which would otherwise be caused at the time of operation of the thermal shutdown circuit 530, can be prevented at low cost. Further, since cancellation of the thermal shutdown state performed during jam processing involves consumption of much time as mentioned previously, the printer 1 can be readily re-started without fail even when a new configuration, such as a timer is not added. As mentioned previously, shift of processing to jam processing does not induce a motor lock error, and results of the determination rendered in operation S21 and operation S22 become N by the wait of three seconds. Processing is considerably simplified, and manufacturing cost of the printer 1 can be curtailed to a much greater extent.

6. Another Exemplary Embodiment of the Present Invention

The present invention is not limited to the above-described exemplary embodiments and can be performed in various forms. For instance, in addition to including jam processing, conceivable error processing that can be recovered by the user may include various error processing operations; for instance, an opened cover, and the like.

In the respective processing operations, a wait of, for example, three seconds is performed in operation S7. Processing may also be completed in an unmodified form, and jam processing pertaining to operation S23 may also be performed in an interrupted manner as mentioned previously. Further, the motor controller of the present invention may also be an apparatus that controls a motor other than the motors of the printing apparatus. The printing apparatus of the present invention is not limited to a specific type of printer, and may be applied to a laser printer or an inkjet printer that has a plurality of motors, or the like.

According to an exemplary embodiment of the present invention, there is provided a motor controller comprising a motor drive unit that drives a plurality of motors; a thermal shutdown unit that is provided in the motor drive unit and that stops the plurality of motors in the case of an overload; a lock signal generation unit that generates a lock signal corresponding to a respective one of the plurality of motors when a rotational speed of the respective motor reaches a threshold speed set for the respective motor; and an operation determination unit which, when the lock signal generation unit interrupts lock signals for all of the plurality of motors, determines that thermal shutdown unit has operated.

As described above, the motor drive unit according to an exemplary embodiment of the present invention drives a plurality of motors, and the thermal shutdown unit provided in the motor drive unit stops all of the plurality of motors in the case of an overload. The lock signal generation unit generates, for the plurality of respective motors, lock signals conforming to the respective motors when rotational speeds of the motors reach a threshold speed set for the motor. Further, an operation determination unit determines, when the lock signal generation unit interrupts the lock signals for all of the plurality of motors, that thermal shutdown unit has operated. Specifically, when the rotational speeds of the plurality of motors have deviated from the threshold speed, the operation determination unit considers that the thermal shutdown unit has operated.

Therefore, in the exemplary embodiments of the present invention, even when a common motor drive unit is utilized, the thermal shutdown unit can be determined to have operated by means of a simple configuration. Accordingly, occurrence of a service error, which would otherwise be caused when the motors are stopped by means of operation of the thermal shutdown unit, can be prevented at low cost.

The motor controller may also further comprise an error processing shift unit that shifts, when the operation determination unit determines that the thermal shutdown unit has operated, processing of a control system including the motor controller to error processing which can be recovered by a general user.

At the time of operation of the thermal shutdown unit, the error processing shift unit shifts processing of the control system including the motor controller to error processing that can be recovered by the user. Accordingly, in this case, the halt of the motors induced by operation of the thermal shutdown unit is not taken as a service error, and it becomes more reliably to enable the user to recover the halt of the motors. Further, the temperatures of the motors usually decrease in the middle of the user recovering the error, and operation of the thermal shutdown unit also ends. Therefore, in this case, re-driving of the motors can be readily realized after the halt of the motor by means of operation of the thermal shutdown unit without addition of a new configuration, such as a timer.

In this case, in the motor controller applied to a printer that performs printing by means of the plurality of motors, the error processing may also be jam processing. Moreover, in that case, when all of the plurality of motors are stopped during a printing operation, jam processing may be performed by means of an interrupt after a threshold period of time has elapsed since the motors were stopped. The error processing shift unit may also inhibit a shift of processing to another error processing during the threshold period of time since the thermal shutdown unit was determined to have operated.

In this case, when all of the plurality of motors are stopped by operation of the thermal shutdown unit during the course of performance of print processing, jam processing is executed by means of interruption after elapse of a threshold time since the halting of the motors. Therefore, for a threshold period of time since the operation determination unit determined that the thermal shut down unit has operated, the error processing shift unit inhibits a shift of processing to another error processing. As a result, jam processing is automatically subjected to interrupt processing. Accordingly, in this case, the configuration of the printer is simplified further, and manufacturing cost of the printer can be curtailed more preferably.

According to another exemplary embodiment of the present invention, there is provided a printer comprising a motor drive unit that drives a motor; a print unit that performs printing by means of the motor; a thermal shutdown unit that is provided in the motor drive unit and that stops the motor in the case of an overload; an operation determination unit which determines that the thermal shutdown unit has operated; and an error processing shift unit that shifts, when the operation determination unit determines that the thermal shutdown unit has operated, processing of a control system including the motor drive unit to error processing which can be recovered by a general user.

Accordingly, when the motor drive unit drives the motors, the print unit performs printing by means of the motors. The thermal shutdown unit provided in the motor drive unit halts the motors in the case of an overload. When the operation determination unit determines that the thermal shutdown unit has operated, the error processing shift unit shifts processing of the control system including the motor drive unit to error processing that can be recovered by the user.

Therefore, according to exemplary embodiments of the present invention the halt of the motors induced by operation of the thermal shutdown unit is not taken as a service error, and it becomes possible for the user to recover the error. Moreover, during a period in which the user recovers the error, the temperatures of the motors decrease, and operation of the thermal shutdown unit also ends. Consequently, according to exemplary embodiments of the present invention, re-driving of the motors can be readily achieved after the motors are stopped by the thermal shutdown unit without addition of a new configuration, such as a timer. Error processing may also be jam processing.

While the present invention has been shown and described with reference to certain exemplary embodiments thereof, it will be understood by those skilled in the art that various changes inform and details may be made therein without departing from the spirit and scope of the invention as defined by the appended claims.

What is claimed is:

1. A motor controller comprising:

a motor drive unit that drives a plurality of motors;

a thermal shutdown unit that is provided in the motor drive unit and that stops the plurality of motors in the case of an overload;

a lock signal generation unit that generates a lock signal corresponding to a respective one of the plurality of motors when a rotational speed of the respective motor reaches a threshold speed set for the respective motor; and an operation determination unit which, when the lock signal generation unit interrupts lock signals for all of the plurality of motors, determines that the thermal shutdown unit has operated.

2. The motor controller according to claim 1, wherein the motor drive unit is a single integrated circuit chip that includes:

a plurality of motor drivers, each of the motor drivers is configured to drive a respective one of the motors; and the thermal shutdown unit.

3. The motor controller according to claim 1, further comprising:

an error processing shift unit which, when the operation determination unit determines that the thermal shutdown unit has operated, shifts processing of a control system including the motor controller to error processing which can be handled by a general user.

4. The motor controller according to claim 3, which is applied to a printer that performs printing by means of the plurality of motors, wherein the error processing is jam processing.

5. The motor controller according to claim 4, wherein, when all of the plurality of motors are stopped during print processing, jam processing is executed by an interrupt after an elapse of a predetermined time; and the error processing shift unit inhibits a shift of processing to another error processing for the predetermined time measured from a time at which the operation determination unit determined that the thermal shutdown unit has operated.

* * * * *